United States Patent
Ishii

(10) Patent No.: US 12,207,001 B2
(45) Date of Patent: Jan. 21, 2025

(54) APPARATUS, OPTICAL APPARATUS, IMAGE PICKUP METHOD, AND NON-TRANSITORY COMPUTER-READABLE STORAGE MEDIUM

(71) Applicant: CANON KABUSHIKI KAISHA, Tokyo (JP)

(72) Inventor: Masaki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 18/059,895

(22) Filed: Nov. 29, 2022

(65) Prior Publication Data
US 2023/0179875 A1 Jun. 8, 2023

(30) Foreign Application Priority Data
Dec. 3, 2021 (JP) ................................. 2021-197123

(51) Int. Cl.
*H04N 23/81* (2023.01)
*H04N 23/55* (2023.01)

(52) U.S. Cl.
CPC ............. *H04N 23/81* (2023.01); *H04N 23/55* (2023.01)

(58) Field of Classification Search
CPC ........ H04N 23/12; H04N 23/55; H04N 23/81; H04N 25/61
See application file for complete search history.

(56) References Cited

U.S. PATENT DOCUMENTS

| | | | | |
|---|---|---|---|---|
| 2008/0273191 A1* | 11/2008 | Kim | ........................ | G01S 11/12 356/29 |
| 2009/0009633 A1* | 1/2009 | Suto | ........................ | H04N 23/60 348/241 |
| 2010/0171866 A1* | 7/2010 | Brady | .................... | H04N 23/55 348/340 |
| 2013/0265459 A1* | 10/2013 | Duparre | ............... | G02B 3/0068 348/218.1 |
| 2014/0240548 A1* | 8/2014 | Blayvas | ................. | H04N 23/81 348/239 |
| 2018/0259768 A1* | 9/2018 | Watson | ................ | G02B 21/361 |
| 2022/0270211 A1* | 8/2022 | Kusumi | .................... | G06T 5/10 |

FOREIGN PATENT DOCUMENTS

| | | |
|---|---|---|
| JP | 2010256303 A | 11/2010 |
| JP | 2019020951 A | 2/2019 |
| JP | 2020064164 A | 4/2020 |

* cited by examiner

*Primary Examiner* — Amy R Hsu
(74) *Attorney, Agent, or Firm* — Canon U.S.A., Inc. IP Division

(57) ABSTRACT

An apparatus includes a sensor, at least one processor; and at least one memory coupled to the at least one processor, the memory having instructions that, when executed by the at least one processor, perform to acquire lens information related to a lens apparatus, acquire array information related to an optical apparatus, acquire aberration correction information based on the lens information and the array information, cut out a plurality of images in a tile form from an image signal output by the sensor picking up a light beam incident from an object through a filter of the optical apparatus, and correct an aberration in the plurality of images, based on the aberration correction information.

19 Claims, 5 Drawing Sheets

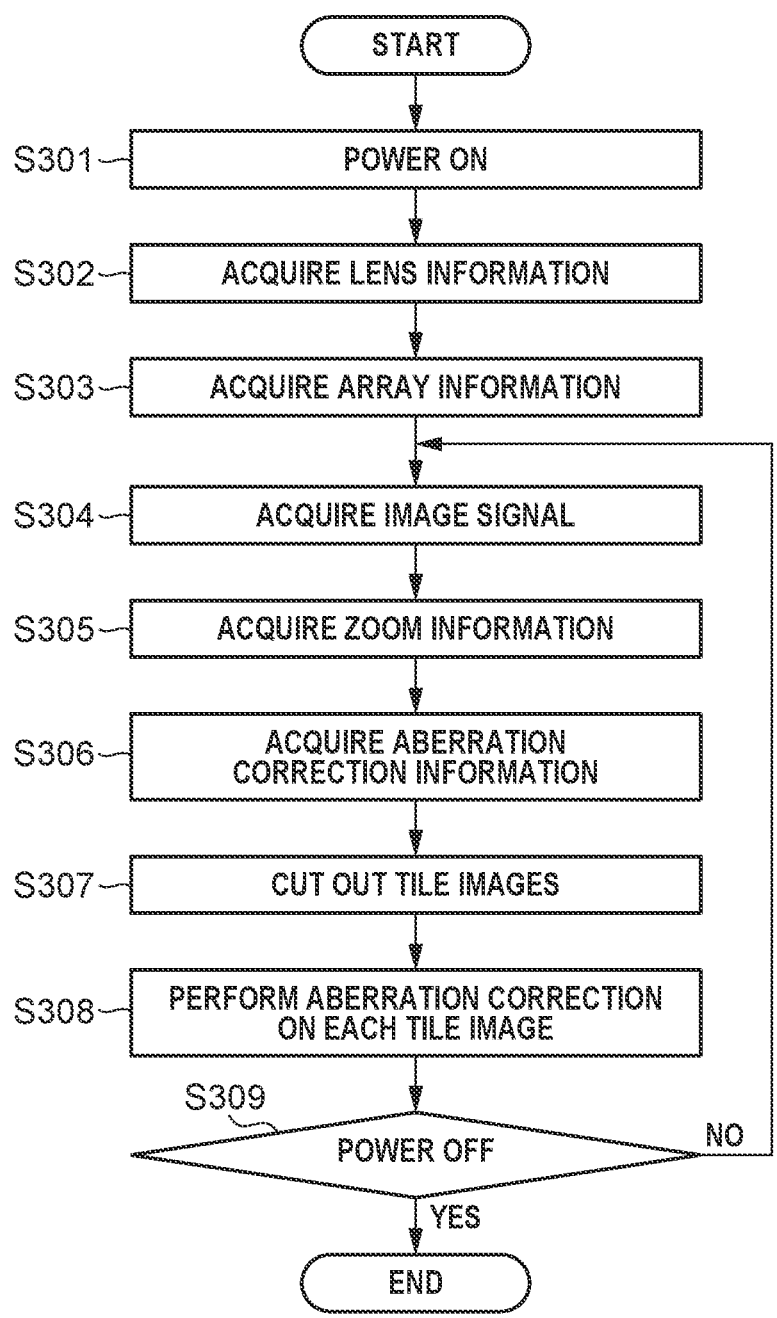

FIG. 4A
IMAGE SIGNAL
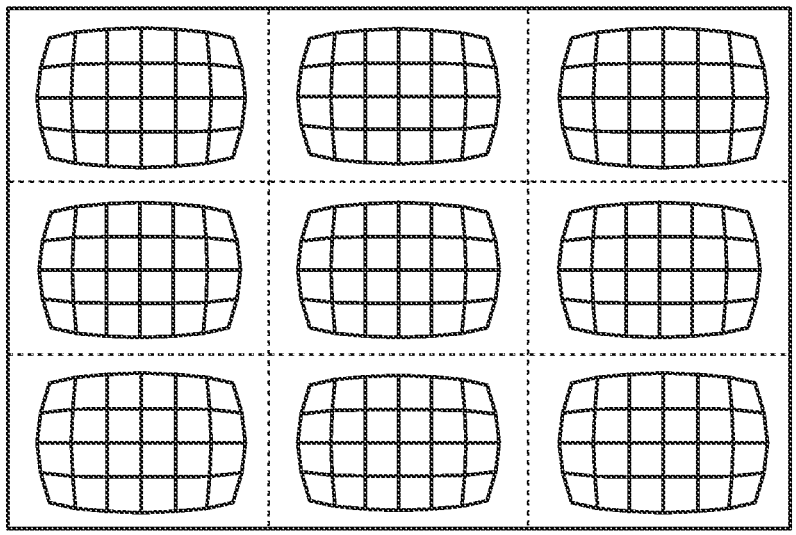
FIG. 4B
TILE IMAGES BEFORE ABERRATION CORRECTION
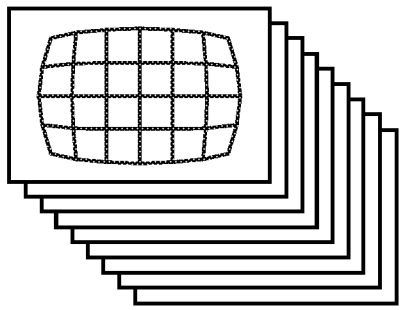
FIG. 4D
TRANSFORM COEFFICIENTS FOR TILE IMAGES
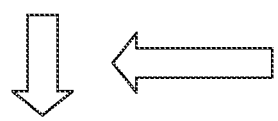
FIG. 4C
TILE IMAGES AFTER ABERRATION CORRECTION
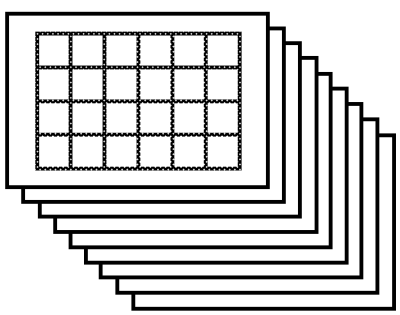

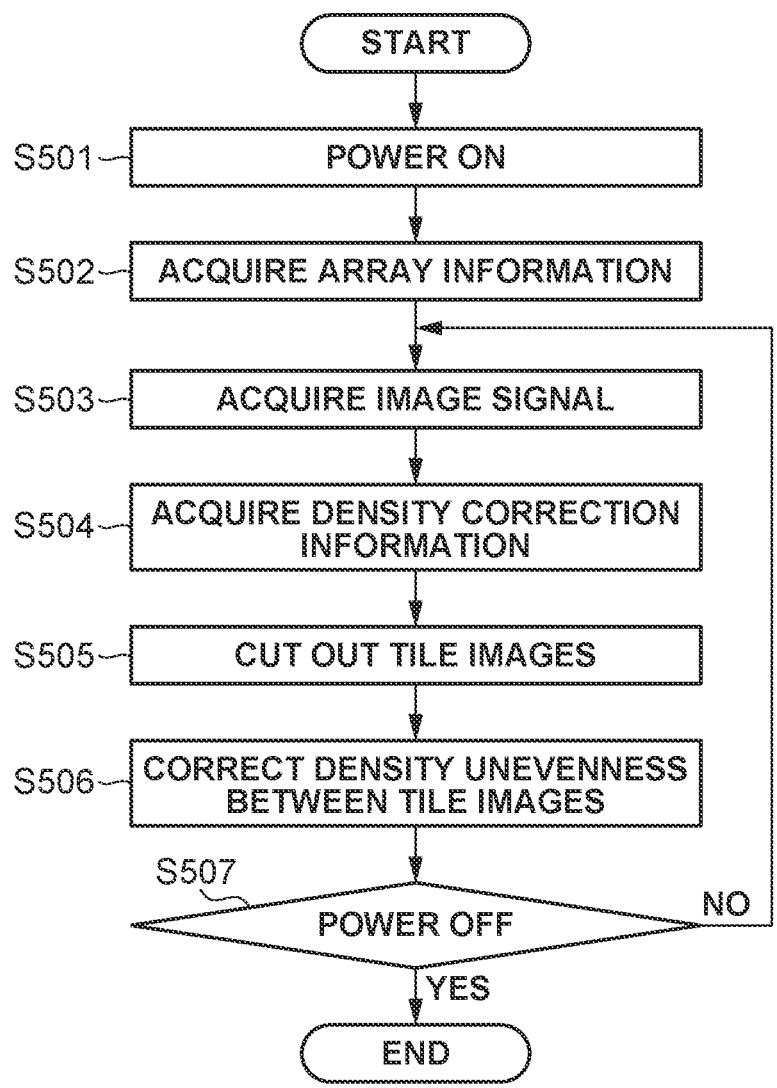

APPARATUS, OPTICAL APPARATUS, IMAGE PICKUP METHOD, AND NON-TRANSITORY COMPUTER-READABLE STORAGE MEDIUM

BACKGROUND

Technical Field

The aspect of the embodiments relates to an image pickup apparatus for simultaneously picking up a plurality of images using an optical apparatus that is replaceable with respect to the image pickup apparatus as a multispectral camera, a control method for the image pickup apparatus, a storage medium, and an optical apparatus.

Description of the Related Art

Multispectral cameras, also referred to as multi-band cameras, have been known as cameras configured to capture a plurality of different spectral components in a spectroscopic spectrum. Multispectral cameras are utilized for, for example, food inspection based on images each obtained from a different spectral component.

An example of an image pickup system adopted in multispectral cameras is a tiled multispectral filter array having a configuration in which, on a front side (object side) of an image sensor, filters are arranged for respective partial areas (tiles) in a manner corresponding to an image pickup area of an image sensor. The adoption of this system makes it possible to simultaneously acquire a plurality of tiled-form band images (tile images) from the image sensor in one image pickup operation. For example, Japanese Patent Application Laid-Open No. 2020-64164 discusses an optical apparatus that is configured to disperse a light beam into different wavelength bands and includes a replaceable lens array and a replaceable band-pass filter array, and also discusses an image pickup system including the optical apparatus.

In images obtained by a digital camera, an image distortion or an image size difference between different band images occur due to an optical apparatus, such as a lens. An image distortion caused by a lens and the like is generally referred to as a distortion aberration, and an image size difference due to a lens and the like is generally referred to as a magnification chromatic aberration. These aberrations occur also when a multispectral camera is used. For example, Japanese Patent Application Laid-Open No. 2019-020951 discusses a technique for correcting a distortion aberration and a magnification chromatic aberration for each band image.

However, in the technique discussed in Japanese Patent Application Laid-Open No. 2020-64164, an image distortion or an image size difference still may occur depending on a position of a band-pass filter in the band-pass filter array.

Further, Japanese Patent Application Laid-Open No. 2019-020951 is considered to have little details on a method for reducing an image distortion or an image size difference in accordance with the lens array and the band-pass filter array in the optical apparatus that is replaceable with respect to a camera. Consequently, there may be a possibility that an image distortion due to optical characteristics of an optical apparatus (which is, for example, an interchangeable lens and an adapter apparatus) that is replaceable with respect to a camera cannot be accurately corrected.

SUMMARY

According to an aspect of the disclosure, an apparatus includes a sensor, at least one processor; and at least one memory coupled to the at least one processor, the at least one memory having instructions that, when executed by the at least one processor, perform to acquire lens information related to a lens apparatus, acquire array information related to an optical apparatus, acquire aberration correction information, based on the lens information and the array information, cut out a plurality of images in a tile form from an image signal output by the sensor picking up a light beam incident from an object through a filter of the optical apparatus, and, correct an aberration in the plurality of images, based on the aberration correction information, wherein the filter includes a plurality of areas to disperse the light beam from the object into a plurality of spectral components, and wherein each of the plurality of images corresponds to a different area among the plurality of areas of the filter.

Further features of the disclosure will become apparent from the following description of exemplary embodiments with reference to the attached drawings.

BRIEF DESCRIPTION OF THE DRAWINGS

FIG. 3 is a flowchart illustrating aberration correction processing according to the first exemplary embodiment.

FIGS. 4A to 4D are diagrams each illustrating a method for cutting out tile images and performing aberration correction processing on the tile images according to the first exemplary embodiment.

FIG. 5 is a flowchart illustrating density correction processing according to a second exemplary embodiment of the disclosure.

DESCRIPTION OF THE EMBODIMENTS (Basic Configuration of Image Pickup Apparatus 1)

Figure 1:
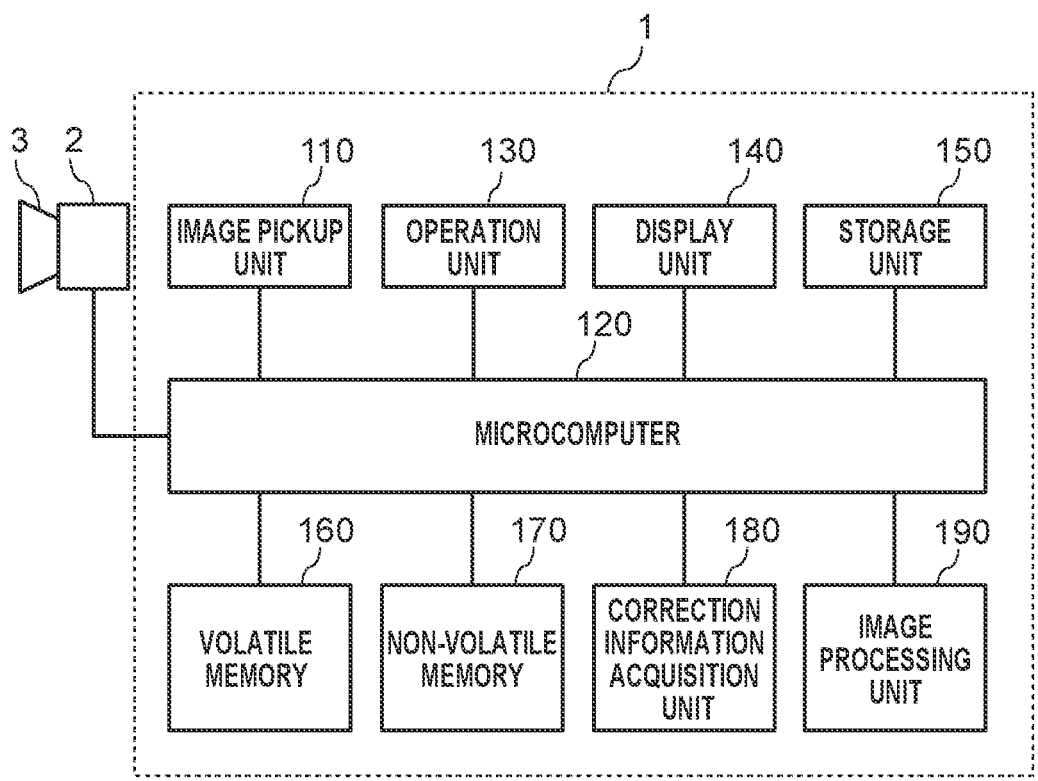
FIG. 1 is a block diagram illustrating a configuration example of an image pickup apparatus according to a first exemplary embodiment of the disclosure.

Exemplary embodiments of the disclosure will be described below with reference to the accompanying drawings. FIG. 1 is a block diagram illustrating a configuration example of an image pickup apparatus 1 according to a first exemplary embodiment of the disclosure.

One or more functional blocks illustrated in FIG. 1 may be implemented by hardware, such as an application-specific integrated circuit (ASIC) or a programmable logic array (PLA), or may be implemented by causing a programmable processor, such as a central processing unit (CPU) or a micro processing unit (MPU), to execute software.

The one or more functional blocks can also be implemented by a combination of software and hardware.

Accordingly, even if different functional blocks are described as operating entities in the following description, these functional blocks can be implemented by the same hardware entity.

As illustrated in FIG. 1, the image pickup apparatus 1 according to the present exemplary embodiment is a lens-interchangeable image pickup apparatus to which an optical apparatus 2 and a lens apparatus 3 are detachably attachable via respective mount portions (not illustrated). However, the configuration of the image pickup apparatus 1 is not limited to this example. For example, the image pickup apparatus 1 can include the optical apparatus 2 and the lens apparatus 3. The optical apparatus 2 and the lens apparatus 3 can be integrated together. A basic configuration of the image pickup apparatus 1 is described below using an example case where the optical apparatus 2 and the lens apparatus 3 are attached to the image pickup apparatus 1. The optical apparatus 2 and the lens apparatus 3 will be described in detail below.

The image pickup apparatus 1 includes an image pickup unit 110, a microcomputer 120, an operation unit 130, a display unit 140, a storage unit 150, a volatile memory 160, a non-volatile memory 170, a correction information acquisition unit 180, and an image processing unit 190.

The image pickup unit 110 is a charge accumulation type solid-state image sensor, such as a charge-coupled device (CCD) sensor or a complementary metal-oxide semiconductor (CMOS) sensor, that receives an optical image formed by light passed through the lens apparatus 3 and dispersed by the optical apparatus 2. Information related to electric charges obtained by photoelectric conversion (image pickup) performed on a light beam which is from an object and is obtained via the lens apparatus 3 is subjected to analog-to-digital (A/D) conversion to generate an image signal as digital data.

The volatile memory 160 is composed of, for example, a random access memory (RAM), and is used to temporarily hold data. The volatile memory 160 is used as a memory for various control operations by the microcomputer 120, image processing by the image processing unit 190, and the like.

The non-volatile memory 170 is composed of, for example, a read-only memory (ROM). The non-volatile memory 170 stores various programs for causing the microcomputer 120 to operate, correction information for use in the image processing unit 190, and the like.

The microcomputer 120 is a control unit configured to control the overall operation of the image pickup apparatus 1, such as control of the entire image pickup apparatus 1 and image processing sequence control, by using the volatile memory 160 as a work memory, based on programs stored in the non-volatile memory 170. The microcomputer 120 can receive lens information related to the lens apparatus 3 and array information related to the optical apparatus 2 from the optical apparatus 2. In other words, the microcomputer 120 functions as a lens information acquisition unit and an array information acquisition unit according to the disclosure.

The correction information acquisition unit 180 acquires correction information to be used for aberration correction and density correction on the image signal. The correction information is preliminarily calculated for each combination of lens information and array information by the microcomputer 120. The preliminarily calculated correction information is associated with the lens information and the array information and is stored as a data table. The data table is desirably stored in the non-volatile memory 170. The correction information acquisition unit 180 compares the acquired lens information and array information with the data table, whereby correction information to be used for aberration correction and density correction can be acquired.

The image processing unit 190 is an image processing unit that performs processing, such as processing of cutting out a plurality of images in a tile form (hereinafter simply referred to as tile images), aberration correction, and density correction on the image signal output from the image pickup unit 110. The image processing unit 190 can include a dedicated circuit block for specific image processing. The microcomputer 120 can perform image processing based on a program.

The operation unit 130 is an operation unit including buttons, switches, dials, and a touch panel that can be manually operated by a user. In the image pickup apparatus 1, the operation unit 130 receives an operation from the user and, based on the operation contents, the microcomputer 120 controls each unit of the image pickup apparatus 1 to implement the operation.

The display unit 140 displays images, a graphical user interface (GUI) screen that is included in a GUI, and the like. The microcomputer 120 generates a display control signal based on a program and controls each unit of the image pickup apparatus 1 to generate a video signal to be displayed on the display unit 140 and output the generated video signal to the display unit 140. The components for the display control in the image pickup apparatus 1 can be up to the interface for outputting the video signal to be displayed on the display unit 140, and the display unit 140 can be an external monitor. The storage unit 150 stores image data output from the image processing unit 190. The storage unit 150 can be incorporated in the image pickup apparatus 1, or can be detachably attached to the image pickup apparatus 1. The above description details the image pickup apparatus 1 according to the first exemplary embodiment.

(Configuration of Optical Apparatus 2 and Details of Image Pickup System)

Figure 2A:
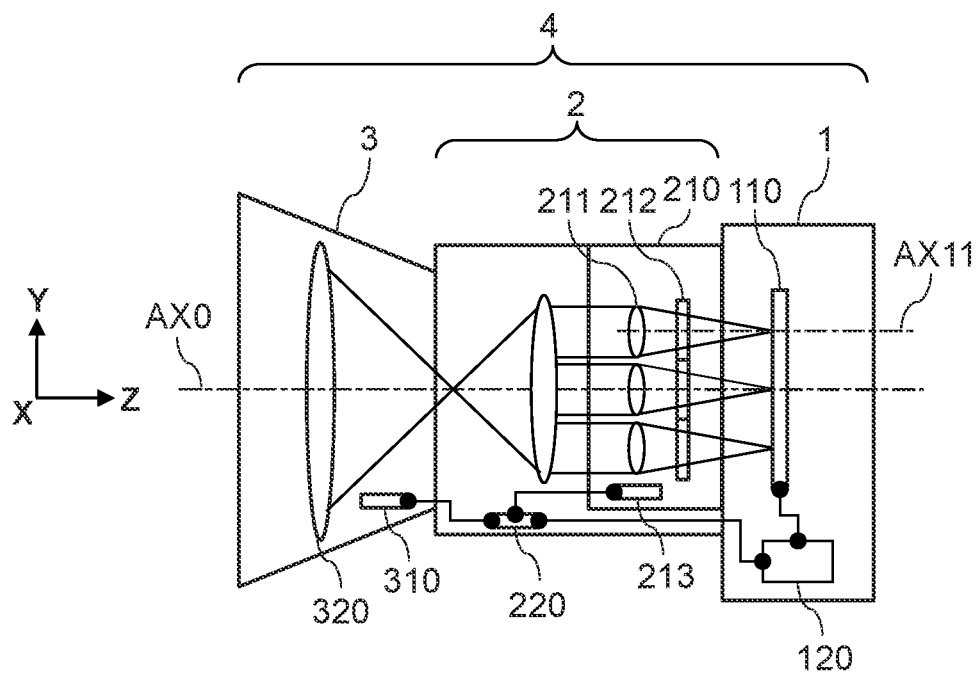
FIGS. 2A to 2C are diagrams each illustrating an image pickup system according to the first exemplary embodiment.
Figure 2B:
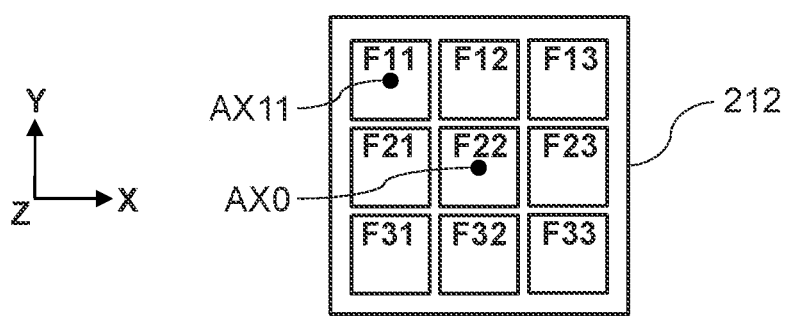
Figure 2C:
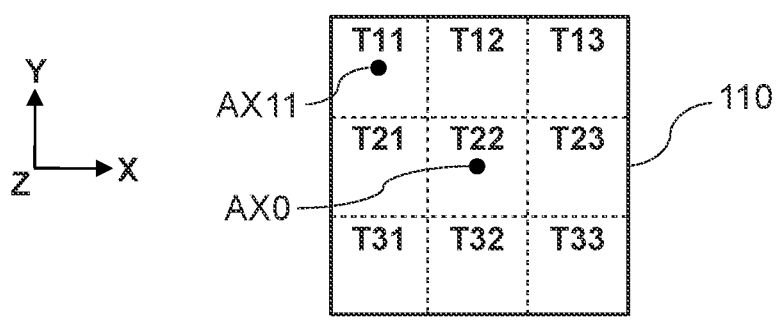

The optical apparatus 2 and an image pickup system according to the first exemplary embodiment will be described below with reference to FIGS. 2A to 2C. FIGS. 2A to 2C are diagrams each illustrating the image pickup system according to the first exemplary embodiment. FIG. 2A illustrates a transition of a light beam to be formed in an object image in the image pickup system using the optical apparatus 2 and transmission and reception of information between the apparatuses. FIG. 2B illustrates a configuration example of a filter array 212 included in the optical apparatus 2.

As illustrated in FIG. 2A, the image pickup system according to the present exemplary embodiment includes the image pickup apparatus 1, the optical apparatus 2, and the lens apparatus 3 that are arranged in this order from an image side. The lens apparatus 3 functions as an optical apparatus for converting a field angle (image-pickup field angle) of the image pickup system. A processing unit 310 is a processing unit that holds lens information related to the lens apparatus 3. Examples of the lens information include an identifier (ID) for identifying a lens type or an individual lens, information inherent in a lens, such as aberration information, and image pickup information, such as a zooming position during an image pickup operation.

An image pickup lens 320 is an optical unit that guides the light beam from the object toward the optical apparatus 2 and the image pickup apparatus 1. Although not illustrated in FIG. 2A, the image pickup lens 320 includes various lens units, such as a zoom lens, a focus lens, and a shift lens.

The optical apparatus 2 functions as an apparatus for dispersing the light beam incident from the object through the lens apparatus 3 into a plurality of spectral components. The optical apparatus 2 includes a lens array 211 and the filter array 212. The lens array 211 includes a plurality of lens units, each of which forms an image of the object. The filter array 212 includes a plurality of filters each arranged on an optical axis of a different lens unit among the lens unit.

The filter array 212 includes three or more filters arranged in a first direction vertical to an optical axis AX0 of the lens apparatus 3 and the optical apparatus 2. In the present exemplary embodiment, as illustrated in FIG. 2B, the filter array 212 includes nine filters F11 to F33 that are arranged in an X-direction and a Y-direction. The filter array 212 includes a plurality of filters each having a different transmission characteristic. This configuration makes it possible to simultaneously acquire images based on the light beam that is from the object and is dispersed into a plurality of different spectral components for the same object.

The optical apparatus 2 according to the present exemplary embodiment has a configuration in which an accessory apparatus 210, including the lens array 211 and the filter array 212, is detachably attachable to the optical apparatus 2. Specifically, the optical apparatus 2 has an opening (not illustrated) formed on a side portion and the accessory apparatus 210 is removably insertable into the opening. With this configuration, the filter array 212 is exchangeable to obtain a different transmission characteristic as needed, depending on the object to be picked up or the purpose for image pickup. In the optical apparatus 2, the lens array 211 is also exchangeable in accordance with the filter array 212. Accordingly, the number of bands and resolution can be adjusted by increasing or decreasing the number of lenses.

A first processing unit 213 is a processing unit that holds array information related to the optical apparatus 2. Examples of the array information include an ID for identifying an accessory apparatus type or an individual accessory apparatus, optical characteristics of the lens array 211, transmission characteristics of the filter array 212, and information related to a layout of filters. The optical apparatus 2 identifies the type of the accessory apparatus 210, and the above-described array information is changed as needed.

A second processing unit 220 is a processing unit that transmits the lens information received from the lens apparatus 3 and the array information acquired from the first processing unit 213 to the image pickup apparatus 1. As described above, the optical apparatus 2 and the image pickup apparatus 1 can be coupled together via the mount portion (not illustrated) and exchange various information in communication via respective communication units, such as electric contacts, each provided on the corresponding mount portion.

The above-described configuration enables the image pickup apparatus 1 to detect whether the lens apparatus 3 and the optical apparatus 2 are attached to the image pickup apparatus 1, and to recognize the type of each apparatus. Since the image pickup apparatus 1 controls the overall operation of the image pickup system, establishment of the communication between the optical apparatus 2 and the image pickup apparatus 1 is desirably performed according to a communication protocol of the image pickup apparatus 1.

FIG. 2C illustrates areas of the image pickup unit 110 each of which receives the light beam from the object via the filter array 212. As illustrated in FIG. 2C, the image pickup apparatus 1 uses the image pickup unit 110 (image sensor) to receive the light beam that passed through the filter array 212. The light beam passed through each filter of the filter array 212 is received on a different partial area (hereinafter referred to as a tile) among partial areas on the image sensor corresponding to an arrangement of the filters of the filter array 212. The image pickup unit 110 (image sensor) outputs an image signal (spectrum data) to which an intensity value of the spectral component for the corresponding filter (hereinafter referred to as a spectral intensity) is added. FIG. 2C illustrates nine tiles T11 to T33 that are arranged in the X-direction and the Y-direction, which are perpendicular to each other, on the image pickup unit 110 (image sensor). For example, a light beam that has passed through the filter F11 of the filter array 212 is received by the tile T11.

Specific examples of spectrum data include data on spectroscopic spectrum in an ultraviolet, visible, or infrared region, Raman spectroscopic spectrum data, nuclear magnetic resonance (NMR) spectrum data, mass spectrum data, liquid chromatography data, gas chromatography data, and sound frequency spectrum data. In particular, spectrum data desirably include any one of data on spectroscopic spectrum in an ultraviolet, visible, or infrared region, Raman spectroscopic spectrum data, and mass spectrum data. In a case where data on spectroscopic spectrum in an ultrasonic, visible, or infrared region or Raman spectroscopic spectrum data is used as spectrum data, the spectral components can be converted into a wavelength or a wave number. In a case where mass spectrum data is used as spectrum data, the spectral components can be converted into a mass-to-charge ratio or a mass number. The above description details the optical apparatus 2 and the image pickup system according to the first exemplary embodiment.

(Details of Aberration Correction Processing)

In the image signal acquired by the image pickup system illustrated in FIG. 2A, an image distortion (distortion) due to a lens or the like, or an image size difference between tile images (magnification chromatic aberration) may occur. An image processing method for reducing the distortion and the magnification chromatic aberration will be described below. FIG. 3 is a flowchart illustrating aberration correction processing according to the first exemplary embodiment. The image processing method according to the present exemplary embodiment will be described below with reference to FIG. 3.

In step S301, the microcomputer 120 turns on the power of the image pickup apparatus 1 in response to a user operation on a power switch included in the operation unit 130.

Next, in step S302, the microcomputer 120 acquires lens information from the lens apparatus 3 currently attached to the image pickup apparatus 1. As described above, the microcomputer 120 receives the ID or the like for identifying the type of the attached lens as lens information from the lens apparatus 3 via the optical apparatus 2. Prior to executing the processing of step S302, the microcomputer 120 determines whether the optical apparatus 2 and the lens apparatus 3 are attached to the image pickup apparatus 1 and determines the type of each apparatus and the like via the electric contacts provided on the mount portions (not illustrated).

Next, in step S303, the microcomputer 120 acquires array information from the optical apparatus 2. As described above, the microcomputer 120 receives the ID or the like for identifying the type of each of the lens array 211 and filter array 212 as the array information.

Next, in step S304, the microcomputer 120 acquires an image signal by using the image pickup unit 110 picking up an image of the object.

Next, in step S305, the microcomputer 120 acquires information (zoom information), about the focal length of the lens apparatus 3 and the like, obtained when the image of the object is picked up in the processing of step S304 from the lens apparatus 3 via the optical apparatus 2.

Next, in step S306, the microcomputer 120 acquires information to be used for various aberration correction operations, based on the acquired lens information and array information. In general, in a case of performing aberration correction processing, a transformation for transforming coordinates of a pixel in an ideal grid after correction and coordinates of the corresponding pixel before the correction is used. For example, the coordinates of a pixel P in an ideal grid are represented by (x, y), the coordinates of the corresponding pixel P' before the correction are represented by (x', y'), and transform coefficients are represented by A0 to A9 and B0 to B9. In this case, for example, the following transformation (1) can be used. The transform coefficients A0 to A9 and B0 to B9 are coefficients that vary in accordance with the lens array 211 and the filter array 212, in addition to the lens type and the zooming position. In particular, as for the filter array 212, the transform coefficients varies also due to the bandwidth of each band-pass filter and the layout of filters. Accordingly, the microcomputer 120 calculates the transform coefficients A0 to A9 and B0 to B9 in advance for each combination of the acquired lens information and array information, and associates the calculated transform coefficients with the lens information and array information to prepare an aberration correction information table. This aberration correction information table is desirably stored in the non-volatile memory 170 of the image pickup apparatus 1, but instead can be held in the first processing unit 213 of the optical apparatus 2 or the processing unit 310 of the lens apparatus 3. In the processing of step S306, a lens identifier and an array identifier are searched in the aberration correction information table, to acquire the transform coefficients A0 to A9 and B0 to B9, which are to be used for aberration correction, for each tile image.

$$\begin{pmatrix} x' \\ y' \end{pmatrix} = \begin{pmatrix} A0 + A1x + A2y + A3x^2 + A4xy + A5y^2 + A6x^3 + A7x^2y + A8xy^2 + A9y^3 \\ B0 + B1x + B2y + B3x^2 + B4xy + B5y^2 + B6x^3 + B7x^2y + B8xy^2 + B9y^3 \end{pmatrix} \quad (1)$$

In the case of acquiring the transform coefficients A0 to A9 and B0 to B9 in advance, the transform coefficients are generally calculated based on the result of picking up an image of a known object, such as a predetermined chart. In this case, the transform coefficients A0 to A9 and B0 to B9 are calculated for each tile image in a manner such that the predetermined object is located at substantially the same position with substantially the same shape and magnification in all tile images obtained by picking up an image of the predetermined chart. With the calculated transform coefficients, the distortion, magnification chromatic aberration, and positional deviation can be collectively corrected.

Next, in step S307, the microcomputer 120 cuts out tile images from the image signal. The processing of steps S307 and S308 will be described in detail below with reference to FIGS. 4A to 4D. FIGS. 4A to 4D each illustrate a method for cutting out tile images and performing aberration correction processing according to the first exemplary embodiment. FIG. 4A illustrates an original image signal. FIG. 4B illustrates tile images before aberration correction. FIG. 4C illustrates tile images after aberration correction. FIG. 4D illustrates transform coefficients for tile images.

The original image signal illustrated in FIG. 4A indicates an image signal based on a light beam received from an object via the nine tiles arranged in the X-direction and Y-direction on the image sensor illustrated in FIG. 2C. The processing of step S307 corresponds to processing of cutting out a number of tile images corresponding to the number of tiles as illustrated in FIG. 4B from the original image signal illustrated in FIG. 4A.

Next, in step S308, the microcomputer 120 performs aberration correction processing on each tile image, based on the aberration correction information acquired in step S306. Specifically, in step S308, the microcomputer 120 performs, on all pixels a coordinate transformation based on the transform coefficients for the tile images acquired in step S306 and the transformation (1) as illustrated in FIG. 4D and interpolation processing for determining the spectral intensity after the transformation. Application of the above-described processing by the microcomputer 120 to all tile images generates all tile images after aberration correction as illustrated in FIG. 4C. In other words, the microcomputer 120 functions as an image generation unit according to the disclosure. After the processing of step S308, a plurality of tile images obtained after aberration correction may be reconfigured to generate a single multiband image.

Lastly, in step S309, the microcomputer 120 determines whether a power-off instruction is issued by a user operation or the like. In a case where the microcomputer 120 determines that the power-off instruction is issued (YES in step S309), the aberration correction processing is terminated. In a case where the microcomputer 120 determines that the power-off instruction is not issued (NO in step S309), the processing of steps S304 to S309 is repeated. In a case of acquiring a moving image, the processing of steps S304 to S309 is repeated. In a case of acquiring a still image, processing of determining whether a still image pickup instruction is issued can be performed before step S304 and the processing of steps S304 to S309 can be repeated based on the result of the determination processing. The above description details the aberration correction processing according to the present exemplary embodiment.

As described above, the image pickup apparatus 1 according to the present exemplary embodiment acquires aberration correction information corresponding to each of a plurality of tile images (multiband images), based on lens information and array information, whereby the aberration correction processing can be collectively performed based on the aberration correction information. This configuration eliminates the need for, for example, executing aberration correction processing on each of a plurality of images obtained via a filter array including a plurality of filters configured to disperse a light beam into different spectral components, which leads to a reduction in time required for aberration correction.

Second Exemplary Embodiment

Next, a configuration example of the image pickup apparatus 1 according to a second exemplary embodiment of the disclosure will be described. The configurations of the image pickup apparatus 1, the optical apparatus 2, and the lens apparatus 3 are similar to those of the first exemplary embodiment described above, and thus the redundant descriptions are omitted. Only components that are different from the components of the first exemplary embodiment described above will be described.

Even in a case where spectral characteristics of an object in tile images obtained via the optical apparatus 2 are uniform regardless of a wavelength, unevenness in brightness density (unevenness in spectral intensity) can occur due to optical characteristics of the lens apparatus 3, transmission characteristics of the filter array 212 in the optical apparatus 2, sensitivity characteristics of the image sensor, and the like. FIG. 5 is a flowchart illustrating density correction processing according to the second exemplary embodiment. An image processing method for reducing the effects of density unevenness will be described below with reference to FIG. 5.

In step S501, the microcomputer 120 turns on the power of the image pickup apparatus 1 in response to a user operation on the power switch included in the operation unit 130. Next, in step S502, the microcomputer 120 acquires array information from the optical apparatus 2. Next, in step S503, the microcomputer 120 acquires an image signal by picking up an image of the object using the image pickup unit 110.

The processing of steps S501 to S503 is similar to the processing of steps S301, S303, and S304 in the first exemplary embodiment described above.

Next, in step S504, the microcomputer 120 acquires information on density correction processing to be applied to the image signal, based on the acquired array information. As described above, a difference in brightness between tile images (density unevenness) can occur due to optical characteristics of the lens apparatus 3, transmission characteristics of the lens array 211 and the filter array 212 included in the optical apparatus 2, sensitivity characteristics of the image pickup unit 110, and the like. The difference in brightness between a plurality of tile images acquired at the same timing may lead to failure in obtaining an accurate processing result in a case of using the plurality of tile images for various processing operations (e.g., when the tile images are used as teacher data in artificial intelligence (AI) processing).

Thus, according to the present exemplary embodiment, in the processing of step S504, a density ratio between tile images is calculated in advance for each combination of the array information and the image pickup apparatus 1, and a density correction information table is prepared in advance as information related to the array information and the image pickup apparatus 1 which are associated with each other. The microcomputer 120 searches the density correction information table for the array identifier, to acquire the density ratio between tile images to be used for density correction.

This configuration enables the image pickup apparatus 1 according to the present exemplary embodiment to correct the brightness (spectral intensity) of each pixel in each tile image, based on the density correction information table every time an image of the object is picked up, whereby the difference in brightness (density unevenness) between the tile images can be reduced. The density correction information table is desirably stored in the non-volatile memory 170 of the image pickup apparatus 1, but instead can be held in the first processing unit 213 of the optical apparatus 2.

In a case where the density ratio between tile images is preliminarily calculated, the density ratio is generally calculated based on the result of picking up an image of a white object, such as a white balance chart. As a method for calculating the density ratio between tile images using such a white balance chart, calculation of a mean value of spectrum intensities for each tile image is performed for all tile images generated by picking up an image of the white balance chart. In this calculation, it is desirable to calculate the mean value of spectrum intensities at a central portion of each tile image, to reduce the effects of shading. The mean value of spectrum intensities is set as the density of each tile image. The spectral intensity can be set as the luminance of each image, and the mean value at a central portion of each image can be set as the density of each tile image. Then, a reference tile image is selected and the density ratio between the reference tile image and the other tile images is calculated, whereby the density ratio between tile images is generated.

Table 1 to be described below illustrates an example of the density ratio (brightness ratio) between tile images as density correction information. Table 1 illustrates a case where an array structure includes a lens array and a filter array each of which are divided into 4×3 areas (divided into 12 tiles), and band-pass filters are formed in a manner such that a center wavelengths of the band-pass filters are set in increments of 50 nm in a range from 475 nm to 1025 nm. In the example illustrated in Table 1, the tile image corresponding to the band-pass filter with a center wavelength of 975 nm is set as a reference tile image (density ratio "1") and the density ratio between the reference tile image and the other tile images is calculated.

TABLE 1

| Tile Position | Center Wavelength of Band-pass Filter [nm] | Density Ratio between Tile Images |
|---|---|---|
| T11 | 575 | 0.30 |
| T12 | 875 | 0.72 |
| T13 | 1025 | 0.34 |
| T14 | 675 | 0.57 |
| T21 | 775 | 0.84 |
| T22 | 975 | 1.00 |
| T23 | 475 | 0.16 |
| T24 | 825 | 0.63 |
| T31 | 625 | 0.42 |
| T32 | 525 | 0.25 |
| T33 | 925 | 0.96 |
| T34 | 725 | 0.49 |

Referring again to FIG. 5, in step S505, the microcomputer 120 cuts out tile images from the image signal. A method for cutting out tile images is substantially the same as step S307 in the first exemplary embodiment described above, and thus the description thereof is omitted.

Next, in step S506, the microcomputer 120 corrects the unevenness in density between tile images, based on information related to the density ratio acquired in step S504. When the spectral intensity of the pixel at the position represented by the coordinates (x, y) in a tile image "t" is represented by It(x, y), the spectral intensity obtained after density correction is represented by I't(x, y), and the density ratio between a reference tile image "s" and the tile image "t" is represented by Rst, the following formula (2) can be used as a correction formula. In the processing of step S506, spectral intensity correction processing based on this correction formula is performed on all pixels in each tile image, to generate the tile image after density correction. Further, the spectral intensity correction processing is performed on all tile images, to generate all tile images after density correction.

$$I't(x, y) = \frac{It(x, y)}{Rst} \quad (2)$$

After the processing of step S506, a plurality of tile images obtained after density correction can be reconfigured to generate a single multiband image. Lastly, in step S507, the microcomputer 120 determines whether the power-off instruction is issued by a user operation or the like. In a case where the microcomputer 120 determines that the power-off instruction is issued (YES in step S507), the density correction processing is terminated. In a case where the microcomputer 120 determines that the power-off instruction is not issued (NO in step S507), the processing of steps S503 to S507 is repeated. In this case, the processing procedure is substantially similar to the aberration correction processing in the first exemplary embodiment described above, and thus the redundant descriptions are omitted. The above description details the density correction processing according to the present exemplary embodiment.

While the exemplary embodiments of the disclosure are described above, the disclosure is not limited to these exemplary embodiments. Various modifications and changes can be made within the scope of the disclosure. While the above-described exemplary embodiments illustrate an example where aberration correction processing and density correction processing are implemented by performing processing in each functional unit of the image pickup apparatus 1, the disclosure is not limited to this example. For example, some of the functions of the image pickup apparatus 1 can be implemented by an image processing apparatus connected with the image pickup apparatus 1 via a network or the like.

While the above-described exemplary embodiments illustrate an example where each of the lens array 211 and the filter array 212 included in the optical apparatus 2 are divided into nine areas (3×3 areas), the disclosure is not limited to this example. For example, any number of areas, such as 4×4 areas or 4×3 areas, can be set and any other setting method can be used at least in a case where an aberration correction table and a density correction table are calculated for each divided area.

While the above-described exemplary embodiments illustrate a method for acquiring lens information and array information from the optical apparatus 2 and the lens apparatus 3, the disclosure is not limited to this example. For example, lens information and array information can be acquired from an external apparatus (a personal computer (PC), a smartphone, etc.) that is connectable with the image pickup apparatus 1, and the aberration correction table and the density correction table can be calculated based on the acquired information. In other words, any relevant information can be acquired from an apparatus other than the apparatuses directly connected with the image pickup apparatus 1, and the aberration correction table and the density correction can be calculated based on the acquired information.

While the above-described exemplary embodiments illustrate an example in which a digital camera is used as the image pickup apparatus 1, to implement the disclosure, the disclosure is not limited to this example. For example, image pickup apparatuses other than a digital camera, such as a digital video camera, a wearable terminal, and a security camera can be used.

While the above-described exemplary embodiments illustrate an example in which a lens-interchangeable digital camera to which the lens apparatus 3 is detachably attached is used as an example of the image pickup apparatus 1, to implement the disclosure, a lens-integrated digital camera can also be used. In this case, the digital camera at least having a configuration in which a member substantially the same as the optical apparatus 2 can be inserted to a main body of the image pickup apparatus 1 or into an optical path on the lens side can be used.

While the above-described exemplary embodiments illustrate a configuration in which the overall operation of the image pickup apparatus 1 is controlled by causing the units constituting the image pickup system to operate in cooperation, based on the microcomputer 120, the disclosure is not limited to this configuration. For example, (computer) programs based on processing procedures illustrated in FIGS. 3 and 5 can be preliminarily stored in a ROM area or the like of the non-volatile memory 170 in the image pickup apparatus 1. The microcomputer 120 can execute the programs to control the overall operation of the image pickup system. A program format to be used is not particularly limited at least in a case where a program function is provided. For example, an object code, a program to be executed by an interpreter, or script data to be supplied to an operating system (OS) can be used. Examples of a recording medium to supply the programs can include a hard disk, a magnetic recording medium, such as a magnetic tape, and an optical/magneto-optical recording medium.

Other Exemplary Embodiments

The disclosure can also be implemented by processing in which a program for implementing one or more functions according to the above-described exemplary embodiments is supplied to a system or an apparatus via a network or a storage medium, and one or more processors in the system or the apparatus read out and execute the program. The disclosure can also be implemented by a circuit (e.g., an ASIC) for implementing one or more functions according to the above-described exemplary embodiments.

According to an aspect of the disclosure, it is possible to prevent deterioration in image quality due to aberration in a camera system using an optical apparatus that is replaceable with respect to an image pickup apparatus as a multispectral camera.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-197123, filed Dec. 3, 2021, which is hereby incorporated by reference herein in its entirety.

What is claimed is:

1. An apparatus comprising:
a sensor;
at least one processor; and
at least one memory coupled to the at least one processor, the at least one memory having instructions that, when executed by the at least one processor, perform to:
acquire lens information related to a lens apparatus;
acquire array information related to an optical apparatus;
acquire aberration correction information, based on the lens information and the array information;
cut out a plurality of images in a tile form from an image signal output by the sensor picking up a light beam incident from an object through a filter of the optical apparatus; and
correct an aberration in the plurality of images, based on the aberration correction information,
wherein the filter includes a plurality of areas to disperse the light beam from the object into a plurality of spectral components, and
wherein each of the plurality of images corresponds to a different area among the plurality of areas of the filter.

2. The apparatus according to claim 1, wherein the array information includes information related to a type of the filter.

3. The apparatus according to claim 1, wherein the array information includes information related to transmission characteristics of a filter array of the filter and a layout of the plurality of areas.

4. The apparatus according to claim 1, wherein the filter is removably insertable into the optical apparatus.

5. The apparatus according to claim 1, wherein the filter is disposed in the optical apparatus.

6. The apparatus according to claim 1,
wherein the optical apparatus includes a lens array including a plurality of lens units, and
wherein each of the plurality of images corresponds to a different lens unit among the plurality of lens units in the lens array.

7. The apparatus according to claim 6, wherein the array information includes information related to a type of the lens array.

8. The apparatus according to claim 6, wherein the array information includes information related to optical characteristics of the lens array and a layout of the plurality of lens units.

9. The apparatus according to claim 6, wherein the lens array is removably insertable into the optical apparatus.

10. The apparatus according to claim 6, wherein the lens array is disposed in the optical apparatus.

11. The apparatus according to claim 1, wherein the lens information includes information related to a type of the lens apparatus.

12. The apparatus according to claim 1, wherein the lens information includes information related to a zooming position.

13. The apparatus according to claim 1, wherein the aberration correction information is calculated for correction of the plurality of images acquired by picking up of a predetermined object, and by using the aberration correction information, a size, and a magnification of the predetermined object will be same between the plurality of images.

14. The apparatus according to claim 13, wherein the aberration correction information is used to correct a pixel position in each of the plurality of images.

15. An optical apparatus comprising:
a sensor;
at least one processor; and
at least one memory coupled to the at least one processor, the at least one memory having instructions that, when executed by the at least one processor, perform to:
acquire lens information related to a lens apparatus;
acquire array information related to the optical apparatus;
acquire aberration correction information, based on the lens information and the array information;
cut out a plurality of images in a tile form from an image signal output by the sensor picking up a light beam incident from an object through a filter of the optical apparatus; and
correct an aberration in the plurality of images, based on the aberration correction information,
wherein the filter includes a plurality of areas to disperse the light beam from the object into a plurality of spectral components, and
wherein each of the plurality of images corresponds to a different area among the plurality of areas of the filter.

16. The optical apparatus according to claim 15, wherein the optical apparatus is detachably attachable to a mount portion provided on the apparatus.

17. An apparatus comprising:
at least one processor; and
at least one memory coupled to the at least one processor, the at least one memory having instructions that, when executed by the at least one processor, perform to:
acquire lens information related to a lens apparatus;
acquire aberration correction information, based on the lens information and array information related to an optical apparatus; and
transmit the correction information to the image pickup apparatus,
wherein a predetermined filter includes a plurality of areas to disperse a light beam from an object into a plurality of spectral components.

18. A method to control an apparatus comprising a sensor, the method comprising:
acquiring lens information related to a lens apparatus;
acquiring array information related to an optical apparatus;
acquiring aberration correction information, based on the lens information and the array information;
cutting out a plurality of images in a tile form from an image signal output by the sensor picking up a light beam incident from an object through a filter of the optical apparatus; and
correcting an aberration in the plurality of images, based on the aberration correction information,
wherein the filter includes a plurality of areas to disperse the light beam from the object into a plurality of spectral components.

19. A non-transitory computer-readable storage medium which stores a program for causing a computer of an apparatus to execute a method to control the apparatus comprising a sensor and being able to be connected with a lens apparatus and an optical apparatus, the method comprising:
acquiring lens information related to the lens apparatus;
acquiring array information related to the optical apparatus;

acquiring aberration correction information, based on the lens information and the array information;
cutting out a plurality of images in a tile form from an image signal output by the sensor picking up a light beam incident from an object through a filter of the optical apparatus; and
correcting an aberration in the plurality of images, based on the aberration correction information,
wherein the filter includes a plurality of areas to disperse the light beam from the object into a plurality of spectral components.

* * * * *